United States Patent [19]
Beatty

[11] Patent Number: 4,697,045
[45] Date of Patent: Sep. 29, 1987

[54] ELECTRICALLY INSULATIVE STAPLE

[76] Inventor: Marguerite R. Beatty, 5582 Club View Dr., Yorba Linda, Calif. 92686

[21] Appl. No.: 846,731

[22] Filed: Apr. 3, 1986

[51] Int. Cl.⁴ .............. H01B 17/00; F16B 15/06; E01B 9/06; E06C 9/04
[52] U.S. Cl. ..................... 174/159; 182/90; 238/366; 411/456; 411/471; 411/920
[58] Field of Search .......... 174/159, 164; 248/71, 248/216.1, 217.3; 411/451, 456, 457, 471, 472, 487, 490, 492, 493, 499, 920, 446–450; D8/390, 393; 135/118; 238/295, 366; 182/90

[56] References Cited

U.S. PATENT DOCUMENTS

| D. 28,287 | 2/1898 | Hanline | 411/456 X |
| 100,055 | 2/1870 | Montgomery | 411/456 X |
| 274,481 | 3/1883 | Frost | 411/471 |
| 662,587 | 11/1900 | Blake | 411/920 X |
| 667,700 | 2/1901 | Hick | 411/920 X |
| 712,245 | 10/1902 | Betts et al. | 411/450 |
| 1,051,212 | 1/1913 | Fry | 411/456 |
| 1,103,444 | 7/1914 | Standfest | 411/451 |
| 1,112,849 | 10/1914 | Sertell et al. | 411/456 X |
| 1,310,908 | 7/1919 | Gilbert | 411/471 |
| 1,737,206 | 11/1929 | Stohr | 411/451 X |
| 1,833,786 | 11/1931 | Maraguglio | 411/920 X |
| 2,632,356 | 3/1953 | Thiel | 411/471 |

FOREIGN PATENT DOCUMENTS 19550 of 1913 United Kingdom ................ 411/456

Primary Examiner—Laramie E. Askin
Attorney, Agent, or Firm—Roger A. Marrs

[57] ABSTRACT

A staple for installation in a wood support having a U-shaped body defined by a pair of rod-like legs in fixed parallel spaced-apart relationship terminating at one end with the opposite ends of an arcuate member and each leg terminating its respective other end in a chamfered, cut-away point. Each leg is further provided with a notched barb outwardly extending beyond the surface of each leg defining a rounded ramp on its side nearest the point and a step on its other side. A sleeve of insulative material is disposed on the inside of the staple adjacent to the arcuate member.

2 Claims, 7 Drawing Figures

ELECTRICALLY INSULATIVE STAPLE

BACKGROUND OF THE INVENTION

1. Field of the Invention

The present invention relates to fastening devices and, more particularly, to a novel fastening device of a staple type having means for substantially locking the legs of the staple to a supporting base so that the staple cannot be removed from its installation.

2. Brief Description of the Prior Art

In the past, it has been the conventional practice to employ staples having a pair of prongs joined by a center section which, when driven by an impact member, causes the prongs to enter a supporting material such as wood or the like. Generally, a wire length such as fence wire is positioned between the prongs and is substantially captured by the cross member of the staple when the staple is fully driven into the support member.

Although such conventional staples have been effective for holding a wire to the supporting member, difficulties and problems have been encountered which stem largely from the fact that, after time, the staple tends to withdraw from its installation in the wood base. Also, any undue stress or pressure against the wire will cause the staple to withdraw from its installation. Additionally, electrical problems are sometimes encountered when metal staples are used in combination with metal fence wire. Such problems include antenna interference so that television or radio reception is adversely affected at nearby locations.

Also, it is to be particularly noted that when driving a conventional staple into a wood base, the prongs are pointed to permit easy penetration; however, the prongs are parallel to one another in fixed spaced relationship so that extraction from installation can be readily achieved. Such extraction is not necessarily of benefit and greatly reduces the effectiveness of conventional staples.

Therefore, a long-standing need has existed to provide a novel staple wherein the prongs cannot be readily withdrawn from the installation and which will be suitably insulated from wire or other members that are being held by the staple so that electrical interference or adversities are not encountered.

SUMMARY OF THE INVENTION

Accordingly, the above problems and difficulties are obviated by the present invention which provides a novel staple adapted to be installed in a wooden base or support and which includes a pair of prongs having pointed tips at one end and joined at their opposite end with the ends of an arcuate cross member. An insulative sleeve or solid member is insertably disposed on the inside surface of the arcuate cross member which spaces the arcuate member from wire or other objects intended to be supported by the staple. Means for preventing the withdrawal of the staple from an installed position are provided on the outside surface of the prongs and, in one form, take the shape of an extended barb outwardly projecting from each of the prongs and adapted to engage with the wood of the support member or base. A notch or pocket is provided immediately above the barb on each of the prongs which is filled with the base material so that the staple cannot be removed from its installation.

A feature of the invention resides in forming the points of each of the prongs at the tip of a ramp surface whereby the ramp surfaces on each prong cooperate with one another to expand the prongs as the staple is driven into the support material.

Therefore, it is among the primary objects of the present invention to provide a novel staple having means for preventing the withdrawal of the staple from its installation in a wooden support or base.

Another object of the present invention is to provide a novel staple with at least an outwardly extending barb carried on a prong of the staple which will prevent the removal of the staple upon its installation in a soft, malleable material.

Still another object of the present invention is to provide a novel non-removable staple having an electrically insulative sleeve or solid member insertably carried on the inside of the staple to engage wire or other articles intended to be held in position on a support member or base.

Yet another object of the present invention is to provide a novel spike or staple having at least one hook formed in its prong that will readily hold the spike or staple in an installed position when attempts are made to remove it.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
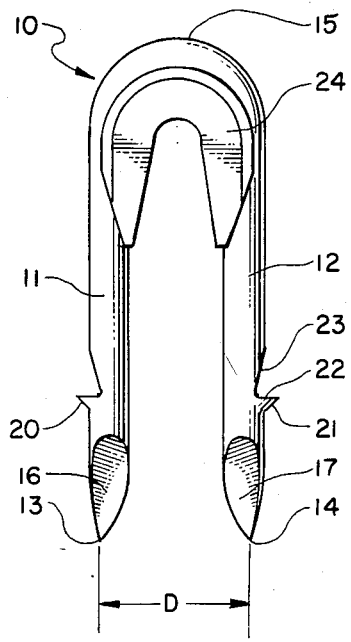
FIG. 1 is a front elevational view of the novel staple incorporating the present invention.

Referring to FIG. 1, the novel staple of the present invention is shown generally at 10 and includes a pair of prongs 11 and 12 which are arranged in parallel fixed spaced-apart relationship terminating at one end in points 13 and 14 and joined at their opposite ends by means of an arcuate cross member 15. The distance between the points 13 and 14 is indicated by the letter D showing the fixed dimension between the points prior to staple installation. The points 13 and 14 are formed by chamfers constituting sloping ramps, as indicated by numerals 16 and 17, which are substantially flat surfaces. The flat surfaces or ramps 16 and 17 are angled with respect to one another so that upon insertion into the supporting base or member, the prongs will be slightly urged away from one another.

The primary feature of the present invention resides in the provision of hooks or barbs such as indicated by numerals 20 and 21 carried on the exterior surface of each of the prongs 11 and 12 respectively. It is to be particulary noted that each barb provides a step, such as step 22 associated with barb 21, which merges with a notch or pocket 23 within the main body of the prong. Therefore, upon insertion into a malleable or pliable material base or member, portions of the base or member 1 occupy the pocket so as to provide a build-up of material the step behind the barb to prevent removal of the staple from installation.

FIG. 1 further illustrates the employment of an electrically insulative sleeve or solid member 24 which is substantially U-shaped in plan view so as to be conformal with the shape of the arcuate cross member 15 and a portion of the inside of the prongs 11 and 12. Preferably, the exterior end of the spacer 24 includes a to receive the inside surface of the cross member 15 and the prongs 11 and 12 respectively.

Figure 2:
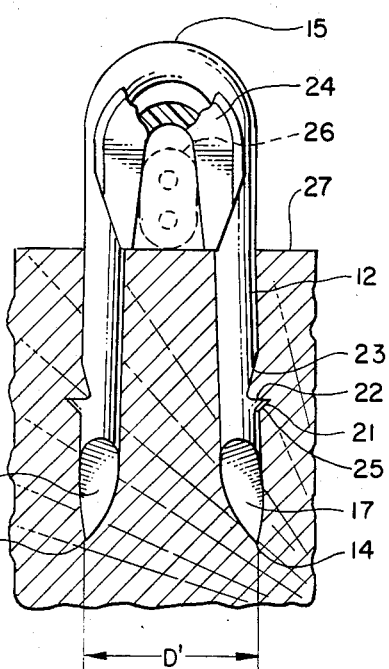
FIG. 2 is a side elevational view of the staple shown in FIG. 1.

Referring now in detail to FIG. 2, it can be seen that the barb 21 includes the step 22 on one side and that the step is substantially horizontal or normal to the longitudinal access of the prong. Also, the underside of the barb is rounded as is indicated by the numeral 25 and the rounded underside of the barb lies beyond or outwardly extended from the exterior of the prong.

Figure 3:
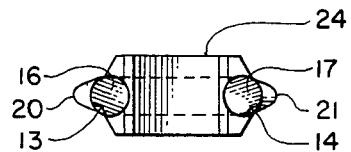
FIG. 3 is a bottom view of the staple shown in FIG. 1 illustrating the angular displacement of the prong ramps forming the pointed ends.

Referring now in detail to FIG. 3, it can be seen that the flat ramps 16 and 17 are not parallel and that they are angularly disposed with respect to one another. Such provision results in a spreading of the prongs slightly as the staple is driven into the base member.

Figure 4:
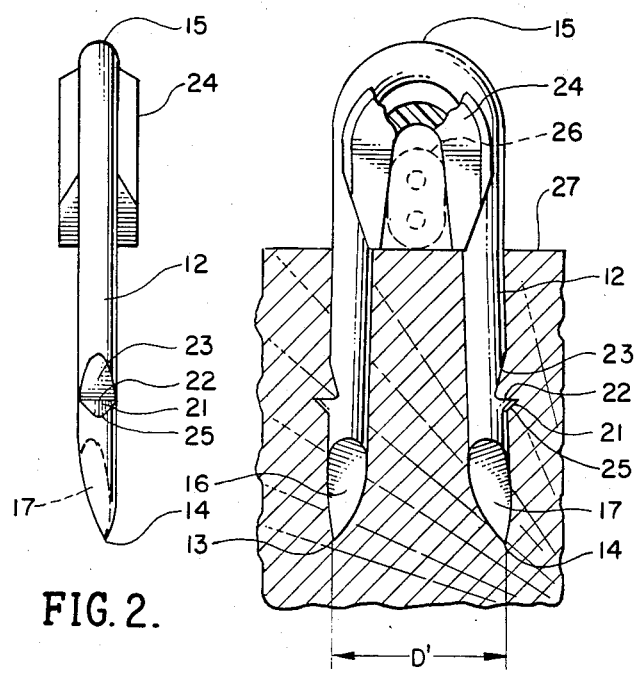
FIG. 4 is a view similar to the view in FIG. 1 illustrating the staple in an installed condition in a wood base or member.

Referring now in detail to FIG. 4, a typical installation of the staple is illustrated in connection with holding an article 26 in position against a wooden support base 27. The points 13 and 14 have penetrated into the wood 27 to the point where the prongs are substantially embedded into the wood and the lower end of the insulator sleeve 24 bears against the external surface of the wood 27. The article 26 is captured by the staple in the installation and is not free to move. As the prongs travel through the wood composition under the impact of a hammer on the cross member 15, the wood will compress as the rounded portion 25 of each barb engages the wood. After penetration of the prong, the compressed wood will expand beyond the barb and occupy the pockets 23 behind the step 22. Therefore, the staple cannot be removed since the material behind the barb will prevent extraction. Also, inasmuch as the ramp surfaces 16 and 17 are angularly disposed with respect to each other, the prongs will have a tendency to spread when driven into the wood composition so that the dimension between the points 13 and 14 are represented by the dimension D'. Thus, the distance D' is increased over the distance D as shown in FIG. 1.

Figure 5:
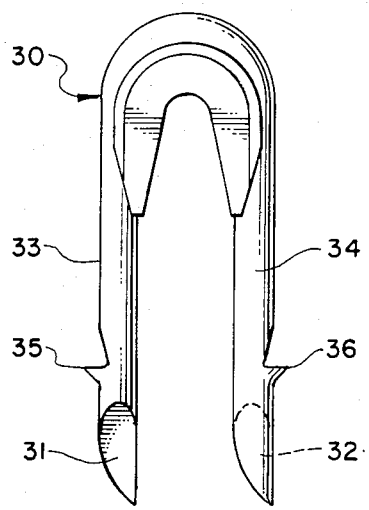
FIG. 5 is a front elevational view of another embodiment of the present invention wherein the angular ramp surfaces forming the prong points are located on opposite sides of the respective prongs.
Figure 6:
FIG. 6 is an end view of the staple embodiment shown in FIG. 5.

Referring now in detail to FIGS. 5 and 6, another embodiment of the invention is illustrated generally at 30 and is substantially similar to the version shown in FIG. 1 with the exception that the flat ramp surfaces indicated by numerals 31 and 32 are arranged on opposite sides of the prongs 33 and 34 respectively. The barbs 35 and 36 are similar to the barbs shown with respect to the earlier version and operate in the same manner as described with respect to FIG. 4. It is to be noted that the barbs are formed past the midsection of the prongs adjacent to the upper edge of the ramps 31 and 32 with respect to version 30. The same relationship is disclosed with respect to the prongs 20 and 21 in the version of FIG. 1. Furthermore, it is to be understood that the barbs or hooks may be placed on the inside diameter of the prongs as opposed to the outside diameter as illustrated. In most instances, it is desirable to retain the prongs on the outside as illustrated so that the barbs or hooks will not interfere with the article 26 during the driving of the staple into the wood composition 27.

Figure 7:
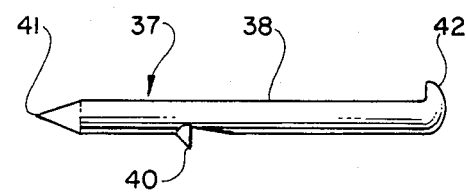
FIG. 7 is a side elevational view of another embodiment of the present invention taking the form of a single-pronged stake having a hooked or barbed shank.

Referring now in detail to FIG. 7, another version of the invention is illustrated which takes the form of a spike having a single prong. The spike is indicated generally 37 at and includes prong 38 having hook or barb 40 carried thereon. The end of the spike is pointed at numeral 41 while the opposite end carries a flanged head 42. The spike 37 may be used in connection with steps for telephone poles or in connection with railroad ties.

In view of the foregoing, it can be seen that the novel staple of the present invention cannot be removed after installation into the wood composition 27. The barbs will permit the prongs to pass into the composition but will prevent extraction since the composition will reside immediately behind the barbs in the pocket provided therein. Also, the resiliency of the prongs will maintain the prongs at the dimension D' as opposed to the dimension D in the unstressed position. The sloping ramps will provide for a slight spreading of the prongs during the forcible urging of the staple and its prongs into the wood composition 27.

While particular embodiments of the present invention have been shown and described, it will be obvious to those skilled in the art that changes and modifications may be made without departing from this invention in its broader aspects and, therefore, the aim of the appended claims is to cover all such changes and modifications as fall within the true spirit and scope of this invention.

What is claimed is:

1. In an electrically insulative staple intended to be impacted into a wood support structure and having a pair of parallel spaced apart prongs joined together at common ends by a semi-circular cross member and pointed at their opposite ends, the improvement which comprises:

a single barb carried on each one of said pair of prongs outwardly projecting from the external side thereof laterally extending beyond the outer dimension of said respective prongs;

said barb carried on each one of said prongs having a rounded portion outwardly disposed beyond the outer dimension of said respective prongs facing said pointed end of each one of said respective prongs opposite to their ends joined with said cross member;

said barb carried on each of said prongs further having a flat surface normal to the longitudinal axis of said each one of said prongs having an outer surface portion exposed beyond the outer dimension of said respective prong and facing said common end of each one of said prongs joined with said cross member and an inner surface portion disposed within the outer dimension of said respective prong;

an internal pocket provided in each one of said prongs immediately adjacent to said barb inner flat surface portion to be occupied by material of a wood support structure to prevent withdrawal of said staple after installation;

an insulative sleeve disposed on the inside surface of said semi-circular cross member and extending partly along the opposing inner length of each of said prongs, said insulative sleeve having a U-shape in front elevational view with an arcuate groove provided in its outer surface occupied by said cross member; and said pointed ends of said prongs having terminating points which include angled flat surfaces lying on different planes facing the terminating points of said pointed ends for cooperating to spread said prongs during impacting installation procedure.

2. A non-removable electrically insulative staple for installation into a wood support structure comprising the combination of:

a U-shaped element having a pair of parallel spaced apart prongs joined by an arcuate cross member on one end and carrying spaced apart pointed ends on the other end of each prong of said pair of prongs;

each prong of said pair of spaced apart prongs being provided with a single outwardly projecting barb laterally extending beyond the outer dimension of said respective prongs substantially closer to said pointed end of each one of said respective prongs than to said arcuate cross member;

said barb of each of said spaced apart prongs having a rounded portion facing said pointed end of each of said spaced apart prongs to permit penetration of said prongs into a wood support structure and further having a flat surface on its side opposite from said rounded portion facing said arcuate cross member normal to the longitudinal axis of each of said pair of prongs for interfering with removal of said prongs;

said pointed ends of said pair of prongs characterized as havig non-parallel flat surfaces disposed at an angular relationship with respect to the longitudinal axis of each of said pair of prongs to promote spreading of said prongs during impacting installation into a wood support structure;

an insulative solid member having a groove receiving the inside surface of said arcuate cross member and extending along said prongs to terminate at the surface of a wood structure;

a notched pocket in each of said prongs immediately adjacent to said barb flat surface to be occupied by a portion of a wood support structure when installed; and said notched pocket having a flat laterally facing surface angularly disposed with respect to said barb flat surface to retain said prongs in a wood structure.

* * * * *